July 26, 1927.  B. W. DAVID  1,637,309

SIGNAL VIEWING ATTACHMENT FOR AUTOMOBILES

Filed Dec. 28, 1926

INVENTOR
Bruce W. David
BY
ATTORNEY

Patented July 26, 1927.

1,637,309

UNITED STATES PATENT OFFICE.

BRUCE W. DAVID, OF CLEVELAND HEIGHTS, OHIO, ASSIGNOR TO THE MOONBEAM MANUFACTURING COMPANY, A CORPORATION OF OHIO.

SIGNAL-VIEWING ATTACHMENT FOR AUTOMOBILES.

Application filed December 28, 1926. Serial No. 157,516.

This invention relates to an optical viewing device which is adapted for attachment to an automobile or the like so as to enable the driver to more readily observe the signal lights which are now being so universally adopted at street intersections for regulation of traffic.

The signal devices, just referred to, are generally provided with red and green lights indicating "Stop" and "Go", respectively, and are, in most cases, suspended at the middle of the intersecting streets at such a height, necessarily, that they can not be readily observed by the driver of the automobile after he has come to a stop at the street intersection in the observance of the "Stop" signal. When the automobile occupies this position, while waiting for the signal to change to "Go", the driver's vision is obstructed by the front portion of the automobile top. Consequently, it is necessary for him to assume an uncomfortable, crooked position of the neck in order to watch the signal lights.

It is therefore the object of the present invention to devise a means whereby the driver may be enabled to view the signals under such circumstances and without the physical discomfort now experienced.

Another object is to devise such a means that is simple in construction and neat in appearance and at the same time efficient in operation.

A further object is to devise such a means in the form of a self-contained attachment that can be readily installed by the user.

A still further object is to construct such an optical viewing device that will effectively refract an image of the signal lights without the confusion of other reflected rays.

Other objects will appear from the following description and claims when considered together with the accompanying drawings.

Figure 1:
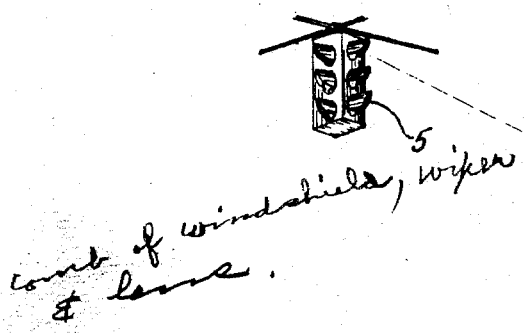
Figure 1:
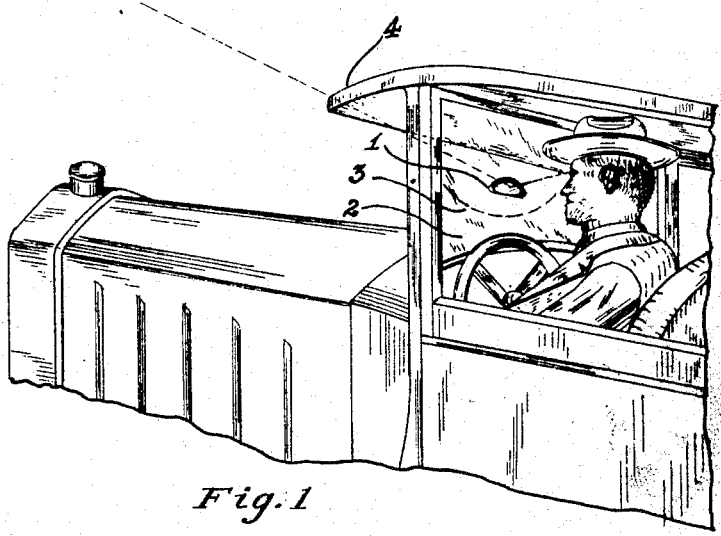
Figure 2:
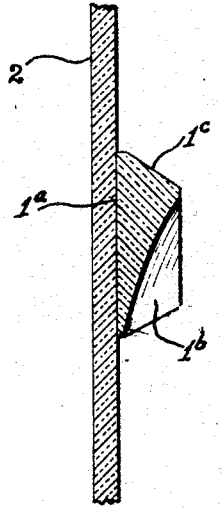
Figure 3:
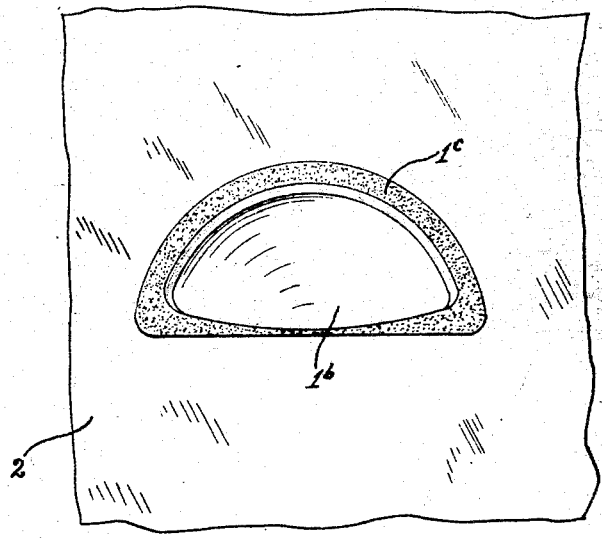

Fig. 1 shows my device installed upon an automobile and illustrates diagrammatically its operation; Fig. 2 is a vertical section of the device itself; and Fig. 3 is an elevation of the same, as seen by the driver.

My invention, in the particular form here illustrated, consists of a semi-circular, plano-sphero-concave lens 1 which is adapted to be attached to the windshield of an automobile. Any suitable transparent cement may be used to secure the lens to the glass 2 of the windshield; or, if desired, other means may be adopted to hold the lens in proper viewing position. Such a lens may be attached to either the inside or outside of the windshield, although it is preferable to secure it to the inside, as here illustrated, since it is then not subjected to rain and other elements. Moreover, this lens, when placed upon the inside, will not interfere with the operation of the familiar windshield cleaner, in case it should be placed within the area 3 covered by such cleaner. And when placed upon the inside and in such position with respect to the cleaner, the vision through the lens will not be interfered with by the rain and other elements. The exact position for the lens may vary according to the particular form of windshield and the extent of the front portion 4 of the automobile top. In other words, the lens may be placed at a higher or lower point on the windshield according to circumstances. Having once found the correct position on a particular style of automobile, the lens can be readily applied at the same point on other cars of the same style, without the necessity of experimenting in each individual case. It is, of course, desirable to place the lens so that it will not obstruct the driver's view of the road, and it may therefore be placed just to one side of his direct line of vision but still within range of the signal lamps 5 and also within the area covered by the windshield cleaner. Fig. 1 indicates only in a very general way how the rays of light from the signal lamps are deflected by the lens so as to be received by the eye of the driver.

The plain face of the lens is indicated by reference numeral $1^a$ and the sphero-concave surface is indicated by reference numeral $1^b$. The lens is beveled, as indicated by reference numeral $1^c$, and it will be observed that this beveled face is practically parallel with the direction of the path of rays from the signal lamps as they are being refracted through the lens. The purpose of this particular feature is to eliminate the upper corner portion through which no rays would be refracted. This beveled edge portion is frosted or ground, as indicated upon the drawing, or it may be otherwise treated or provided with other means, so as to prevent reflection of foreign rays of light back into the eyes of the driver. The ground or frosted condition will diffuse any such rays which might strike the same and thus "regular" reflection is prevented.

It is to be understood that the exact form of my device may be varied and that the present form, as here shown, is merely for purposes of illustration. The following claims are accordingly not limited to the present specific disclosure but are intended to cover any and all modifications or variations thereof within the spirit of my invention.

As shown in the present drawing, the lens is of semi-circular form since the signals to be viewed by the automobile driver are always above. The present semi-circular form has a range sufficient to receive and transmit the rays from the signal lamps under all practical conditions at the present time. If desired, however, the form of the lens may be varied by enlarging the field at the corner portions thereof; in which case, the lens would approximate a semi-elliptical form.

With my device, as above described, the driver is enabled to view the signal without having to assume an uncomfortable position, as is required without my improvement. Furthermore, this device can be produced at a comparatively low cost and can be bought and installed by the driver without involving any change in the automobile structure and without great labor. It is adapted for use upon any of the many various models of automobiles with their different styles and sizes of windshields. Furthermore, this device does not interfere with the driver's view of the road. Also, it is protected from rain and other elements and is, therefore, always adapted to transmit a clear image; and other confusing rays are eliminated. Other advantages will be apparent.

A similar lens may also be mounted upon the upper part of the left front door of the automobile so as to enable the driver to observe the change of signals when he is about to make a left-hand turn at the street intersection. This lens may be mounted in any suitable form of depending bracket which is attached to the top part of the door frame, and in this way the raising and lowering of the window, in a closed car, does not interfere with the use of the present viewing device. The bracket will extend down to a sufficient extent to position the lens at the proper viewing point for the driver, and it may be made adjustable so as to be adapted for application to all styles of automobiles. The same general principle of invention is involved in the use of my viewing device, whether used on the windshield or on the side door and the following claims are intended to comprehend both forms. The maximum degree of efficiency and service is obtained when my invention is applied both to the windshield and to the door in the manner above set forth. When my device is applied to the door, its supporting bracket is so arranged that the lens will be positioned on the inside of the car door when the window is in closed position.

What I claim as new is:

1. In a device of the class described, the combination of an automobile wind-shield or the like, means for cleaning an area of the outside surface of the wind-shield so as to afford a clear vision for the driver, light-refracting means secured to the inside of the wind-shield at a point within the range of said cleaning means and within the vision of the driver, said refracting means increasing in thickness towards its top edge and the angle of refraction of said means being such that the rays of light will be deflected to the eye of the driver, in normal position, from a traffic signal which occupies elevated position and which is otherwise obscured from the view of the driver by the overhanging top portion of the automobile.

2. A device of the class described, comprising a light refracting means secured to the inside surface of an automobile windshield or the like within the range of vision of the driver, said refracting means increasing in thickness towards its top edge, the angle of refraction of said refracting means being such that it will transmit to the eye of the driver, in normal position, an image of a traffic signal which occupies elevated position and which is otherwise obscured from view of the driver by overhanging top portion of the automobile, and said refracting means having an enlarged field of view so as to transmit to the eye of the driver an image of the signal which may be to one side or the other of the direct line of vision of the driver.

3. In a device of the class described, the combination of an automobile wind-shield or the like, and a light refracting means on the inner side thereof, said refracting means being positioned within the range of vision of the driver and increasing in thickness towards its top edge, and the angle of refraction of said refracting means being such that rays of light will be deflected to the eye of the driver, in normal position, from a traffic signal which occupies elevated position and which is otherwise obscured from view of the driver by the overhanging top part of the automobile.

In testimony whereof I affix my signature.

BRUCE W. DAVID.